United States Patent [19]

Arthurs et al.

[11] 4,291,214

[45] Sep. 22, 1981

[54] WELDING APPARATUS HAVING CLOSELY MOUNTED SHUNTS

[75] Inventors: John W. Arthurs, Bloomfield Hills; Ronald Perkowski, South Lyons, both of Mich.

[73] Assignee: Bra-Con Industries, Inc., Livonia, Mich.

[21] Appl. No.: 970,913

[22] Filed: Dec. 19, 1978

[51] Int. Cl.³ .............................................. B23K 11/10
[52] U.S. Cl. ...................................... 219/86.1; 219/116
[58] Field of Search .................... 219/86.1, 86.21, 87, 219/89, 90, 116

[56] References Cited

U.S. PATENT DOCUMENTS

| 1,434,374 | 11/1922 | De Lemon et al. | 219/87 X |
| 2,242,867 | 5/1941 | Martin | 219/87 |
| 2,325,291 | 7/1943 | Weightman | 219/87 |
| 2,491,169 | 12/1949 | Early et al. | 219/86.1 |
| 2,776,362 | 1/1957 | Welch | 219/116 X |
| 2,839,664 | 6/1958 | Fagge | 219/89 |
| 3,066,216 | 11/1962 | Busche | 219/89 |

Primary Examiner—Gene Z. Rubinson
Assistant Examiner—Keith E. George
Attorney, Agent, or Firm—Charles W. Chandler

[57] ABSTRACT

A spot welding machine having a pair of electrodes connected to the transformer by a pair of closely mounted shunts spaced less than one quarter of an inch to reduce both the current loss and the reactive forces.

5 Claims, 5 Drawing Figures

WELDING APPARATUS HAVING CLOSELY MOUNTED SHUNTS

BACKGROUND OF THE INVENTION

This invention is related to machines for spot welding aluminum, and more particularly to such a machine having a pair of shunts connected between the electrodes and the transformer in a close, side-by-side relationship to reduce the reaction normally developed when the electrodes are fired.

Spot welding machines have long been employed for welding steel. However, a special problem arises when such machines are employed for welding aluminum because low resistance aluminum requires two to three times the current required for steel. Usually 440 voltage is supplied to a transformer which reduces the electrode voltage to about 7 volts with an amperage build-up of approximately 30,000 amps. A U-shaped low reactance connection is necessary to accomodate the high amperage welding current. When such amperage is applied to the electrodes, a magnetic force build-up tends to drive conventionally arranged shunts apart as the transformer is fired.

Such a reaction not only reduces the life of the machine, but results in considerable current loss.

SUMMARY OF THE INVENTION

The broad purpose of the present invention is to provide a spot welding machine having a pair of closely mounted shunts, the distance between the two shunts being a fraction of their width.

Shunts mounted in accordance with the preferred embodiment tend to balance the reactive forces built up when current is applied to the electrodes thereby reducing both the current loss, as well as the reaction imposed on the shunts.

Still further objects and advantages of the invention will become apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENTS

Figure 1:
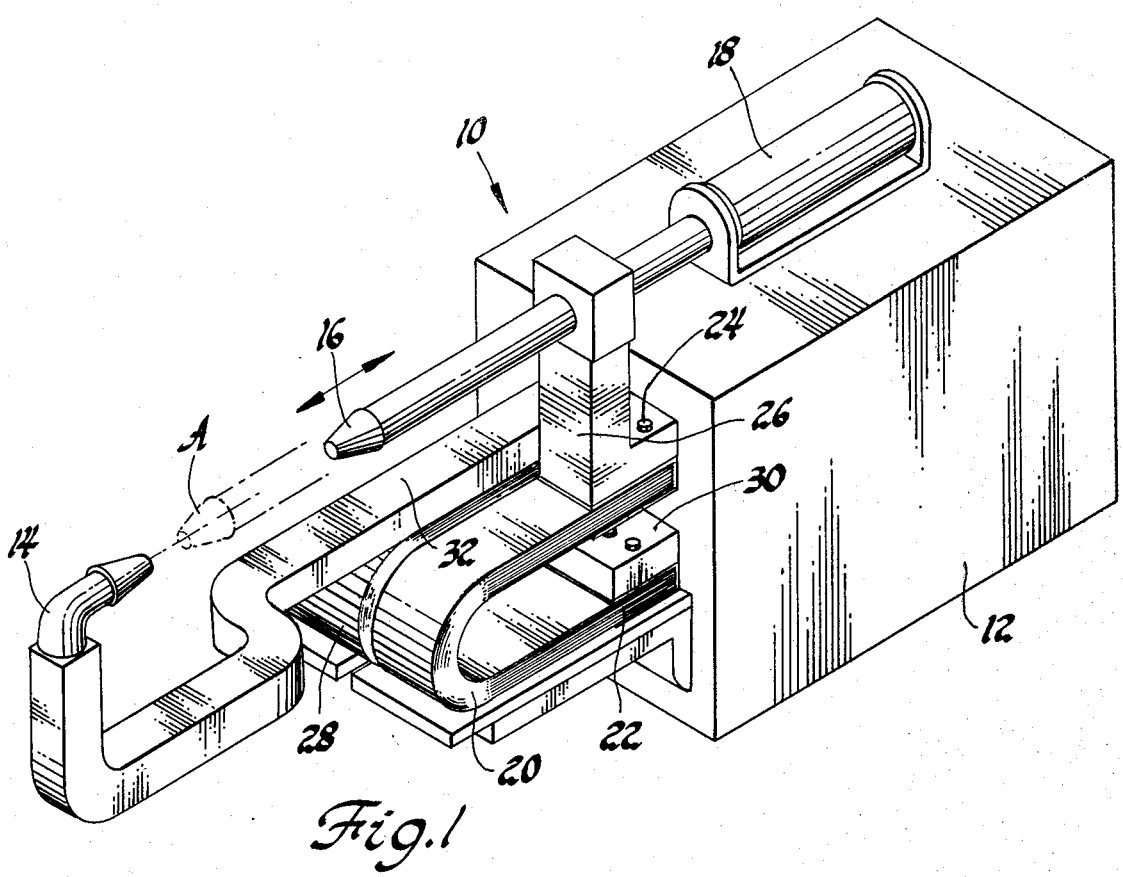
FIG. 1 is a simplified perspective view of a spot welding machine illustrating the preferred embodiment of the invention.

Referring to the drawings, a preferred spot welding machine, illustrated at 10, comprises a conventional spot welding transformer 12 connected to a source of electrical energy and having secondary winding means (not shown) connected to a first electrode 14 and a second electrode 16.

Pneumatic means 18, which alternatively may be hydraulic, is connected to electrode 16 to move it toward the position illustrated in phantom at "A" in which a pair of workpieces (not shown) are disposed between the two electrodes so that the combination of pressure and electrical current join the workpieces together in the manner well known to those skilled in the art.

A flexible shunt 20 is connected between transformer 12 and electrode 16 to provide means for delivering electrical current to the electrode when the transformer is fired. One end 22 of shunt 20 is connected to the transformer and the opposite end is connected a 24 to a support 26 on which electrode 16 is slidably mounted.

A second generally U-shaped shunt 28 has one end connected at 30 to transformer 12 and its opposite end connected to support 32 on which electrode 14 is mounted. Shunt 28 is mounted side-by-side with respect to shunt 20 and is constructed in an identical manner.

Figure 2:
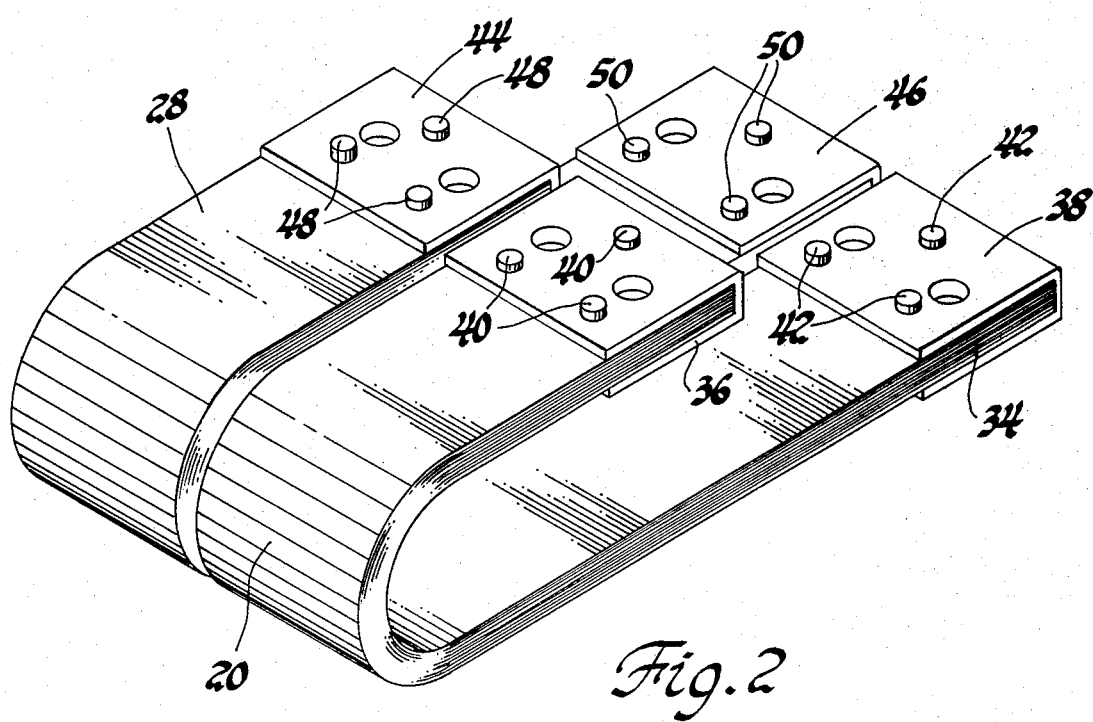
FIG. 2 is an enlarged view of the two flexible shunts of FIG. 1 separated from the remainder of the machine for descriptive purposes.

Referring to FIG. 2, shunts 20 and 28 are illustrated in their side-by-side relationship. Each shunt is formed of a plurality of elongated, flexible copper strips 34. The strips each have a common width, which for descriptive purposes is 2½ inches. One end of each strip forming shunt 20 is mounted in a bracket 36, and its opposite end is mounted in a bracket 38. Rivets 40 connect bracket 36 to the metal strips. Similarly, bracket 38 is connected to the metal strips by rivets 42. The brackets can also be either bolted or soldered to the strips.

Shunt 28 has the ends of its copper strips preferably riveted to bracket 44, and to bracket 46 by rivets 48 and 50, respectively.

The strips are connected so that there is a slight air gap between adjacent strips when the two shunts are in their non-firing relaxed positions. The air gap provides means for cooling the shunts. In addition, the flexible nature of the strips permits relative motion between the lower brackets 38 and 46 which are fixed with respect to the transformer, and the upper brackets when the two electrodes are moved toward their firing position.

Still referring to FIG. 2, the two shunts are preferably mounted side-by-side with their upper legs and their lower legs parallel to one another, with about a one-quarter inch air gap between the two shunts. It is to be noted that the distance between the shunts is about ten percent of their width. A minimal air gap between the shunts permits relative motion during the firing condition of the electrodes, and reduces the current normally lost when the shunts are not so aligned. In addition, when the electrodes are being fired, the reaction between the two shunts tend to be balanced thereby reducing a problem especially associated with welding aluminum.

Figure 3:
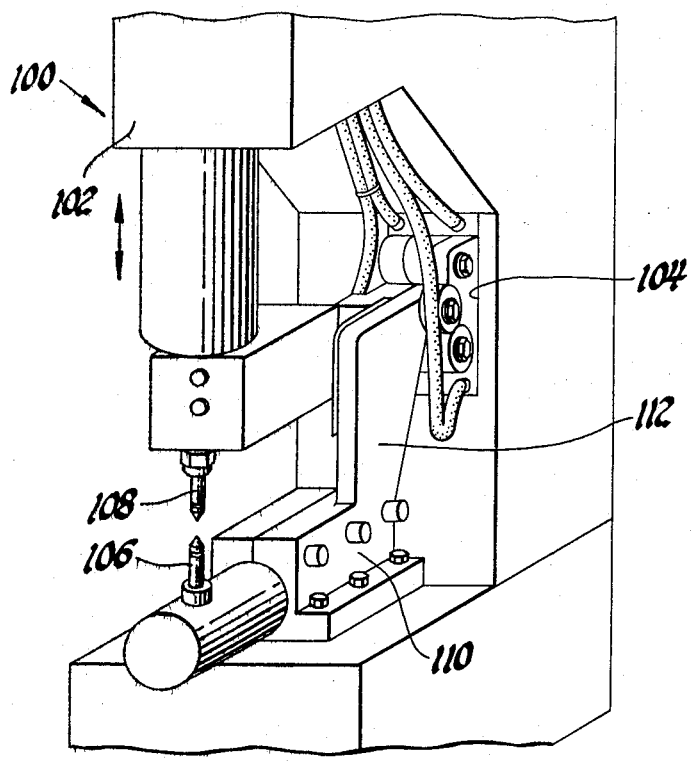
FIG. 3 is a perspective view of another embodiment of the invention employing a flexible shunt mounted adjacent a stationary shunt.
Figure 4:
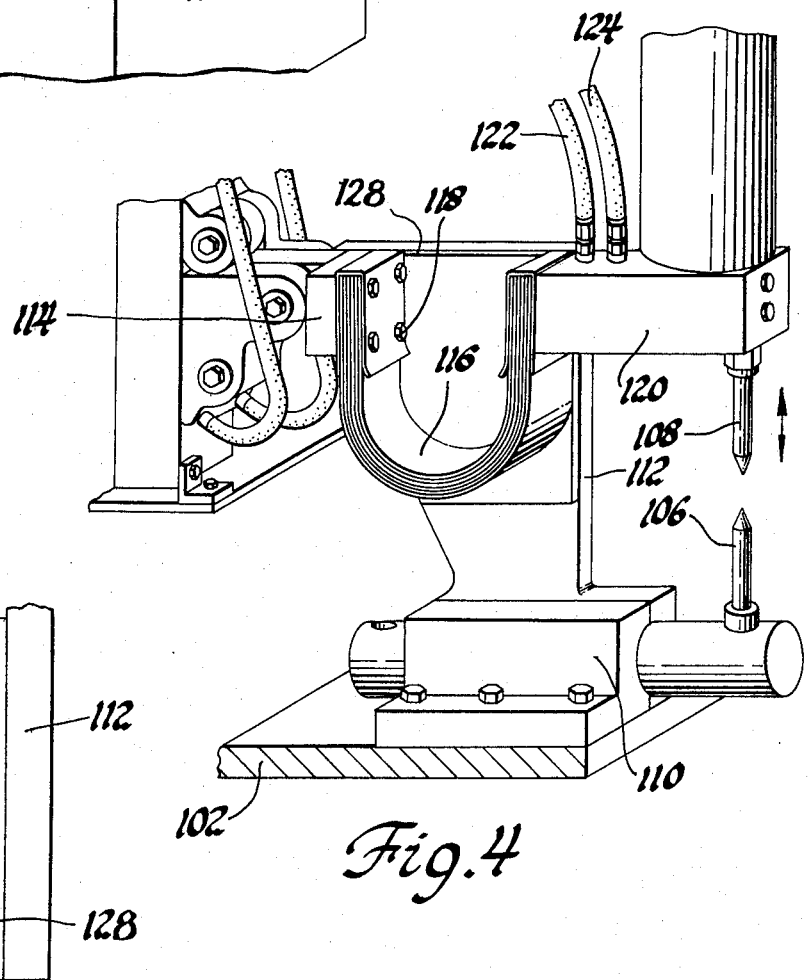
FIG. 4 is another view of the embodiment of FIG. 3.
Figure 5:
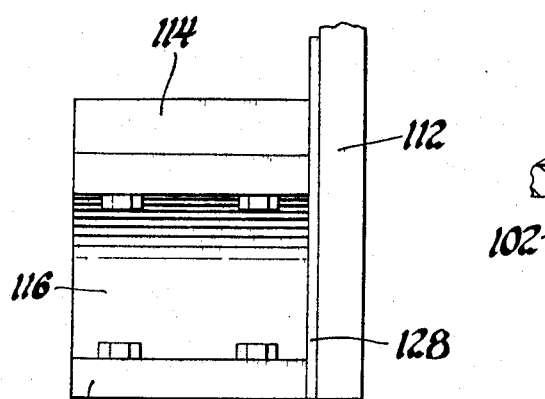
FIG. 5 is a fragmentary plan view of the two shunts.

FIGS. 3-5 illustrate another embodiment of the invention comprising a spot welding machine 100 having a frame 102 housing a transformer 104. Transformer 104 has secondary winding means (not shown) connected to a lower electrode 106 and a movable upper electrode 108. Means 110, mounted on a frame 102 to support lower electrode 106 in a stationary position, includes a plate-like shunt 112 of electrically conductive material for connecting transformer 104 to electrode 106.

Support means 114 is connected to one end of U-shaped flexible shunt 116 by fasteners 118 in a manner similar to that illustrated with respect to the shunts of FIG. 2. The opposite end of flexible shunt 116 is connected to pneumatic power means 120 which support electrode 108. Means 120 is connected to a source of pneumatic energy by connectors 122 and 124 for lowering electrode 108 into a firing position in which it cooperates with electrode 106 in joining together a pair of work pieces (not shown).

Referring to FIG. 5, the stationary end of shunt 116 permits the opposite, movable shunt end 126 to accommodate the motion of electrode 108 as it is being fired. A thin sheet of fiber insulation 128 is mounted between the two shunts. Sheet 128 is preferably about .060 inch thick, and accommodates the relative motion between shunt 116 and shunt 112 as the electrodes are being fired. Sheet 128 permits the two shunts to be closely mounted together but prevents contact between the two shunts during their relative motion.

As in the embodiment of FIGS. 1 and 2, the close spacing between the two shunts reduces the conventional reaction when the electrodes are being fired. Shunt 112 can take the form of a bar or other shapes permitting it to be closely mounted to flexible shunt 116.

Having described our invention, we claim:

1. In a spot welding machine, the combination comprising:
   a transformer;
   a first electrode;
   a second electrode, movable with respect to the first electrode;
   means for moving the second electrode toward the first electrode in a welding motion;
   a first flexible shunt comprising a plurality of thin, elongated flexible metal strips having their ends joined together to collectively form a first leg, a second leg, and a bight connecting the first leg and the second leg, one end of said shunt being connected to the first electrode and its opposite end being connected to the transformer to form an electrical connection therebetween;
   a second flexible shunt comprising a plurality of thin, elongated flexible metal strips having their ends joined together to collectively form a first leg, a second leg, and a bight connecting the first leg and the second leg, one end of the second shunt being connected to the transformer and its opposite end being connected to the second electrode to form an electrical connection therebetween;
   the second shunt being mounted such that the first leg thereof is disposed parallel to the first leg of the first shunt, the second leg of the second shunt is disposed parallel to the second leg of the first shunt, the distance between the respective first legs of said shunts being substantially the same as the distance between the respective second legs of said shunts; and
   said metal strips having a common width and the legs of the second shunt being disposed a distance from the legs of the first shunt a fraction of said common width.

2. A spot welding machine as defined in claim 1, in which the legs of the first shunt are disposed a distance from the legs of the second shunt a distance of about ten percent of said common width.

3. A spot welding machine as defined in claim 1, in which the legs of the first shunt are disposed a distance from the legs of the second shunt of about one quarter of an inch.

4. A spot welding machine as defined in claim 1, in which the legs of the first shunt are disposed with respect to the legs of the second shunt a distance of a fraction of an inch.

5. In a spot welding machine, a combination comprising:
   a transformer;
   a first electrode;
   a second electrode movable with respect to the first electrode;
   means for moving the second electrode toward the first electrode in a welding motion;
   a first shunt having a planar surface and forming an electrically-conductive connection between the transformer and the first electrode;
   a second shunt comprising a plurality of thin, elongated metal strips having their ends joined together to collectively form a first leg, a second leg, and a bight connecting the first leg and the second leg, one end of the second shunt being connected to the transformer and its opposite end being connected to the second electrode to accommodate the second electrode in said welding motion, said first and second legs having a common side edge disposed adjacent the planar surface of the first shunt such that the
   planar surface of the first shunt is parallel to the full length of the second shunt along said common side edge; and
   the common side edge of the second shunt being disposed a distance from the planar surface of the first shunt of about ten percent of the width of said metal strips.

* * * * *